United States Patent [19]

Kaku

[11] Patent Number: 5,771,226
[45] Date of Patent: Jun. 23, 1998

[54] DATA RATE DETECTOR FOR TERMINAL STATION RECEIVER

[75] Inventor: Tomoya Kaku, Tokyo, Japan

[73] Assignee: NEC Corporation, Japan

[21] Appl. No.: 557,610

[22] Filed: Nov. 14, 1995

[30] Foreign Application Priority Data

Nov. 16, 1994 [JP] Japan ................................. 6-305734

[51] Int. Cl.$^6$ ........................................................ H04J 3/22
[52] U.S. Cl. ........................... 370/232; 370/335; 370/342; 375/200; 375/205
[58] Field of Search .................................. 370/232, 333, 370/342, 312, 347, 349, 335; 375/200, 261, 265, 377, 205, 206; 455/54.1, 56.1

[56] References Cited

U.S. PATENT DOCUMENTS

| | | | |
|---|---|---|---|
| 4,887,280 | 12/1989 | Reisenfeld | 375/121 |
| 5,367,533 | 11/1994 | Schilling | 370/342 |
| 5,430,760 | 7/1995 | Dent | 375/200 |
| 5,511,096 | 4/1996 | Huang et al. | 375/261 |
| 5,619,524 | 4/1997 | Ling et al. | 375/377 |

OTHER PUBLICATIONS

Patent Abstracts of Japan, vol. 8, No. 84 (E–239), Apr. 18, 1984 & JP-A-59 004250 Jan. 11, 1984.

*Primary Examiner*—Douglas W. Olms
*Assistant Examiner*—Shick Hom
*Attorney, Agent, or Firm*—Ostrolenk, Faber, Gerb & Soffen, LLP

[57] ABSTRACT

A data rate detector is used for a terminal station receiver for receiving a coded signal which is transmitted at a selected one of a plurality of information data rates and whose transmission power is controlled to a predetermined ratio in accordance with the selected information data rate. The coded signal has at least one power control bit inserted in one information frame to control the transmission power in a terminal station. The detector includes a bit extractor, a comparator, and a rate determination device. The bit extractor extracts the reception power value of the power control bit and the reception power value of an information symbol other than the power control bit from a plurality of symbols constituting an information frame obtained by demodulating the received coded signal in a predetermined interval. The comparator compares the two reception power values extracted by the bit extractor. The rate determination device detects a used information data rate on the basis of the comparison result obtained by the comparator.

20 Claims, 4 Drawing Sheets

DATA RATE DETECTOR FOR TERMINAL STATION RECEIVER

BACKGROUND OF THE INVENTION

The present invention relates to a data rate detector and, more particularly, to a data rate detector for a terminal station receiver conforming to a code division multiple access scheme defined in TIA.IS (Telecommunication Industry Association International Standard) 95 or the like as a standard of a digital cellular system in the North America.

A conventional data rate detector of this type for a terminal station receiver will be descried below.

In the TIA.IS95 scheme, i.e., the CDMA (Code Division Multiple Access) scheme, as a standard of a digital cellular system in the North America, when an information signal is to be transmitted from a base station to a terminal station, a data rate selector 21 selects one of four information data rates of 1,200, 2,400, 4,800, and 9,600 bps in a channel for the transmission of information (to be referred to as an information channel hereinafter) from the user, for each information frame time (20 ms), on the basis of the amount, quality, and the like of data such as audio data to be transmitted. The information signal to be transmitted is then output to one of 9,600, 4,800, 2,400, and 1,200 bps encoders 22a to 22d which corresponds to the selected information data rate.

After convolutional coding processing in the encoders 22a to 22d, information frames respectively consisting of 384, 192, 96, and 48 symbols are output from the encoders 22a to 22d. According to TIA.IS95, these information frames based on the respective information data rates and consisting of the different numbers of symbols respectively output from the 4,800, 2,400, and 1,200 bps encoders 22b, 22c, and 22d are repeated in repeating devices 23b to 23d two times, four times, and eight times, respectively, thereby performing repetitive processing of coded frames. That is, the information frames based on the four information data rates are formed such that each frame consists of 384 symbols per information frame time. The information frames are then subjected to modulation processing such as RF modulation, and the resultant data are transmitted to a communication line through a transmission antenna 26.

In a terminal station receiver 30 shown in FIG. 4, a signal received through a reception antenna 31 are demodulated by a demodulator 32.

In the terminal station receiver 30, when information transmitted from the base station is to be restored on the basis of an output from the demodulator 32, since any specific information data rate on which the information frame is based cannot be determined, decoders 33a to 33d respectively perform decoding processes corresponding to 9,600, 4,800, 2,400, and 1,200 bps for one information channel frame consisting of 384 symbols, which is output from the demodulator 32, in consideration of all the four information data rates. The most probable information data rate is then determined as the information data rate used in the base station in accordance with the decoding results.

More specifically, the decoding results are obtained by the decoders 33a to 33d for the four information data rates, i.e., 9,600, 4,800, 2,400, and 1,200 bps, respectively. Re-encoders 34a to 34d then perform the same coding processes as those performed in the base station, including repetition processes, for the decoding results, respectively, thereby newly forming information frames, each consisting of 384 symbols. Correlators 35a to 35d perform correlation calculation between the received information frames and the newly formed information frames, respectively. A comparing/determining device 36 obtains one of the four correlation results which has the maximum value. The correlation result having the maximum value is then determined as the information data rate of the data transmitted from the base station.

A transmitter 20 in FIG. 3 further includes a PCB (Power Control Bit) generator 25 for generating a PCB to be inserted in an information channel frame to control the transmission power supplied to the terminal station having the receiver 30. The modulator 24 performs modulation by inserting the PCB from the PCB generator 25 into the information channel frame. Although not shown, the receiver 30 in FIG. 4 extracts the PCB from the demodulated information channel frame to control the transmission power.

In the above conventional data rate determination method, since the information data rate of an information frame obtained from a received signal cannot be determined, decoding processes corresponding to the four information data rates, i.e., 9,600, 4,800, 2,400, and 1,200 bps are performed to cope with all the four information data rates. Re-coding processes are then performed for the four decoding results. Correlation calculation is performed between the resultant frames and the received frames. The correlation result having the maximum value is selected as the information data rate.

In order to realize such a method, a large number of steps in processing are required. In addition, three of the four results corresponding to the information data rates, which are obtained by decoding processes, re-decoding processes, and correlation calculation, are discarded, and hence high efficiency cannot be expected.

SUMMARY OF THE INVENTION

It is an object of the present invention to provide a data rate detector which identifies a information data rate used for a received frame before a decoding process to allow reductions in circuit arrangement, processing amount, and the overall power consumption of a receiver.

In order to achieve the above object, according to the present invention, there is provided a data rate detector for a terminal station receiver for receiving a coded signal which is transmitted at a selected one of a plurality of information data rates and whose transmission power is controlled to a predetermined ratio in accordance with the selected information data rate, the coded signal having at least one power control bit inserted in one information frame to control the transmission power in a terminal station, the data rate detector comprising power extraction means for extracting a reception power value of the power control bit and a reception power value of an information symbol other than the power control bit from a plurality of symbols constituting an information frame obtained by demodulating the received coded signal in a predetermined interval, comparing means for comparing the two reception power values extracted by the power extraction means, and detection means for detecting a used information data rate on the basis of the comparison result obtained by the comparing means.

DETAILED DESCRIPTION OF THE PREFERRED EMBODIMENT

An embodiment of the present invention will be described below with reference to FIGS. 1 to 3.

Figure 1:
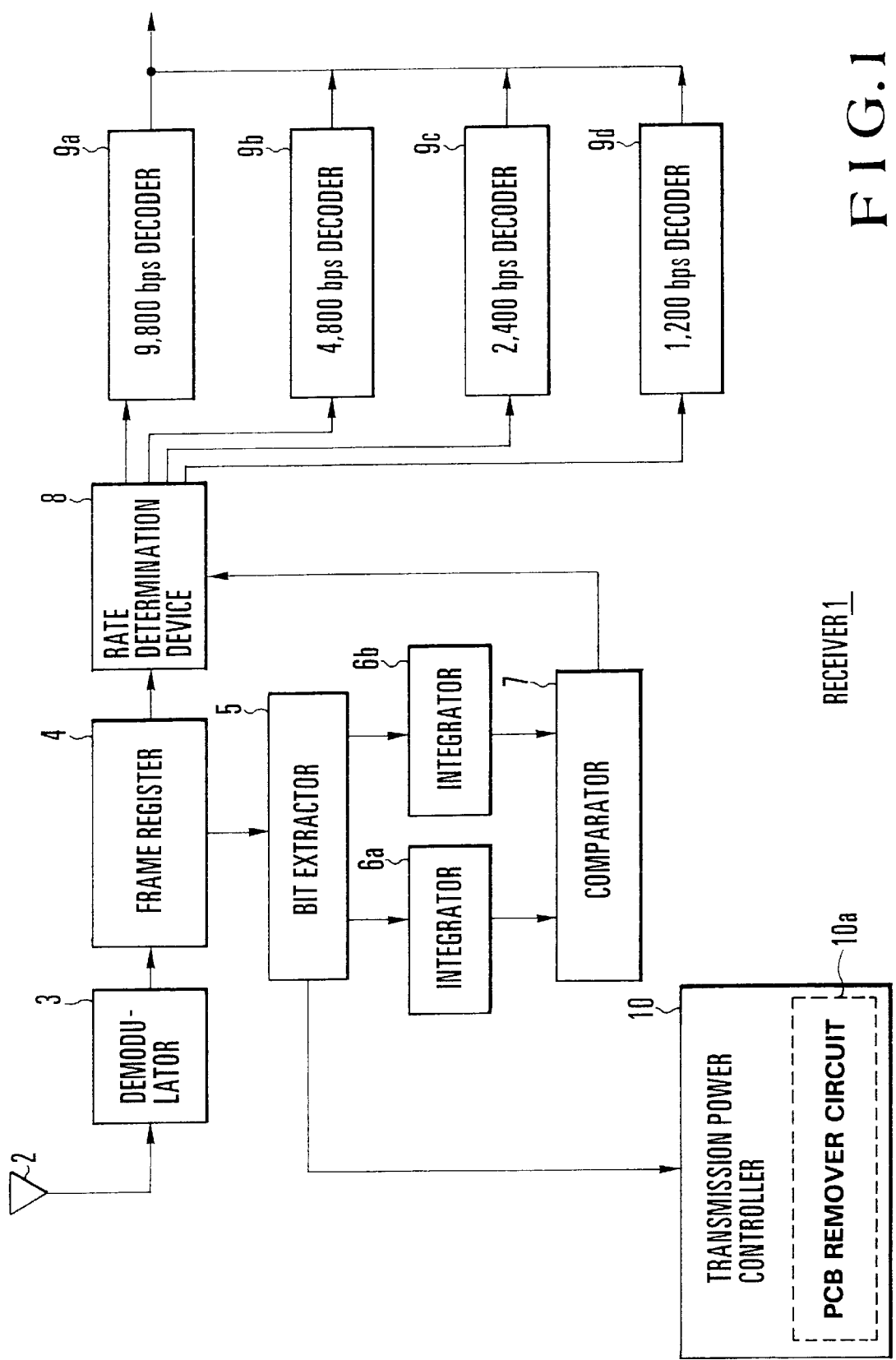
FIG. 1 is a block diagram showing a receiver according to an embodiment of the present invention.
Figure 2:
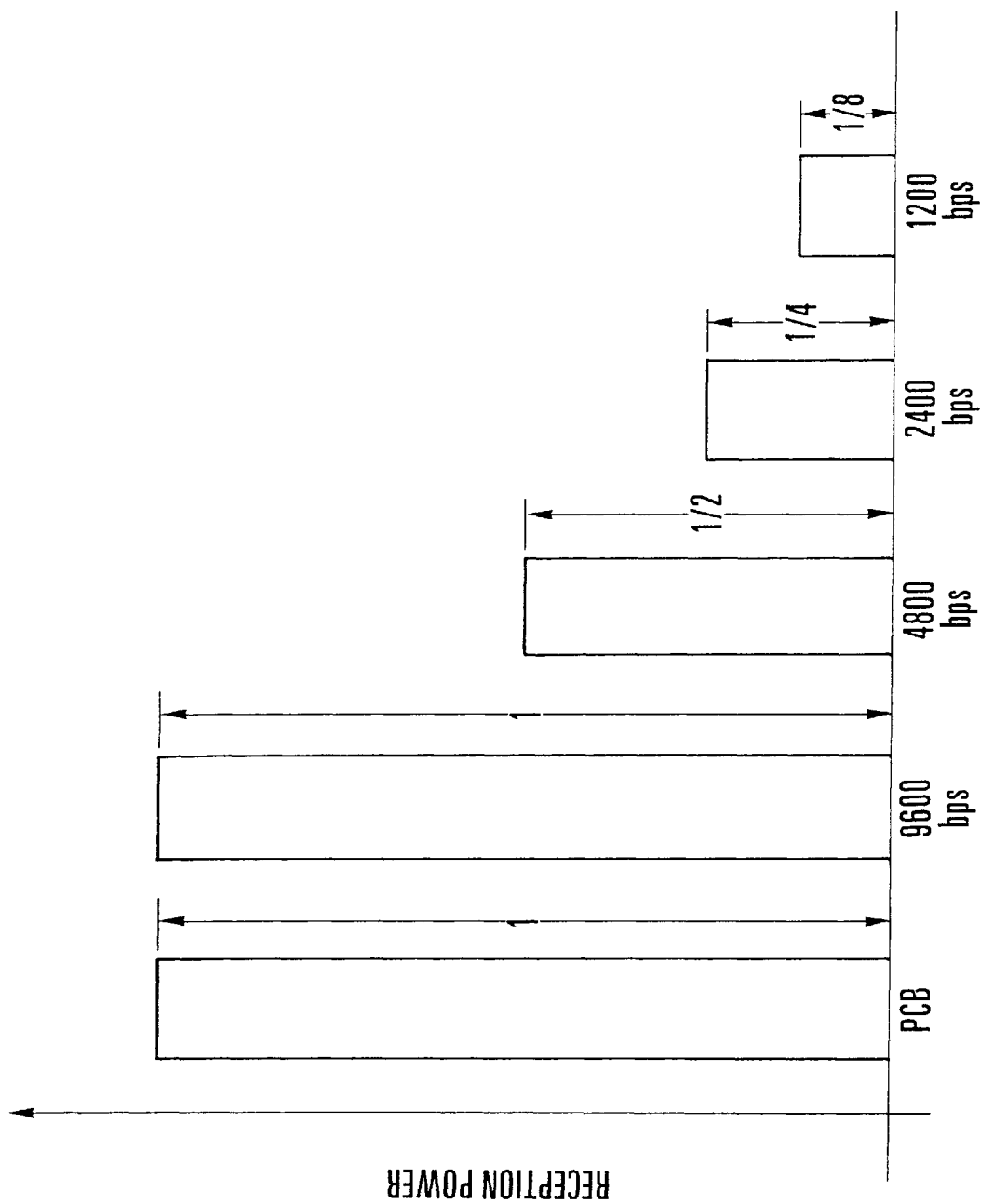
FIG. 2 is a graph showing the relationship between the PCB, the information symbols at the respective information data rates, and the respective reception power values.
Figure 3:
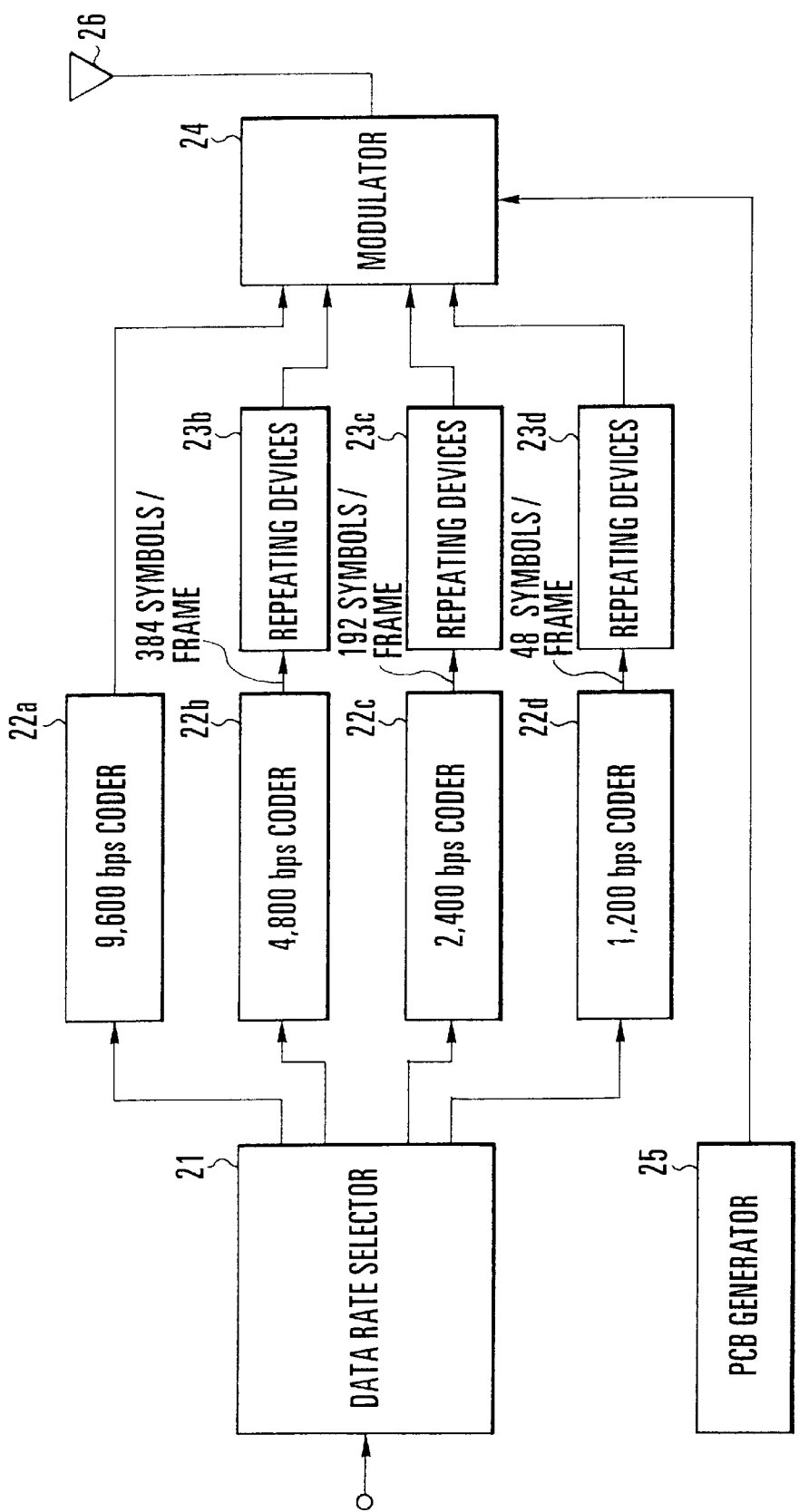
FIG. 3 is a block diagram showing a conventional transmitter.
Figure 4:
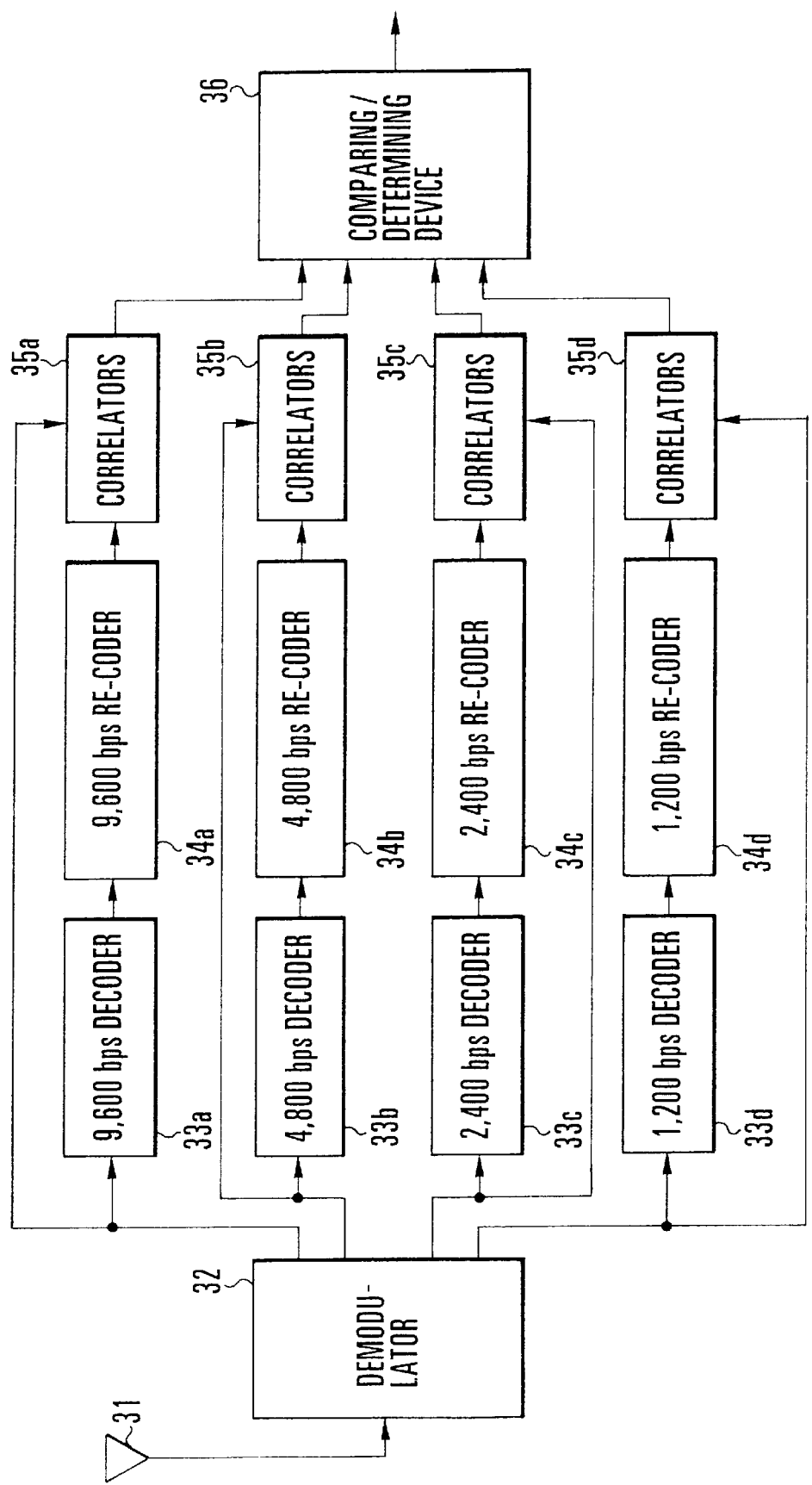
FIG. 4 is a block diagram showing a receiver for receiving data from the transmitter shown in FIG. 3.

FIG. 1 shows the schematic arrangement of a receiver for receiving a signal from a transmitter 20 in FIG. 3. A description of the transmitter 20 will be omitted. Referring to FIG. 1, a receiver 1 includes a reception antenna 2 for receiving an information channel frame transmitted from the transmitter 20 in FIG. 3, a demodulator 3 for demodulating the information channel frame from the reception antenna 2, a frame register 4 for temporarily storing the demodulation result corresponding to one information frame and output from the demodulator 3, a bit extractor 5 for extracting a PCB and information symbol from the demodulation result stored in the frame register 4, integrators 6a and 6b for respectively integrating the power values of the PCB and the information symbol extracted by the bit extractor 5, a comparator 7 for comparing the respective integration values obtained by the integrators 6a and 6b, a rate determination device 8 for determining one of information data rates of 1,200, 2,400, 4,800, and 9,600 bps on the basis of the comparison result obtained by the comparator 7, decoders 9a to 9d which are arranged in correspondence with the four information data rates and adapted to perform a decoding process corresponding to the information data rate determined by the rate determination device 8, and a transmission power controller 10 for controlling the transmission power on the terminal side with the receiver 1 on the basis of the PCB extracted by the bit extractor 5. The transmission power controller 10 has a puncture processor 10a for performing puncture processing of the PCB extracted by the bit extractor 5.

In the receiver 1 having the above arrangement, a signal received through the reception antenna 2 is demodulated by the demodulator 3. The demodulation result is output to the frame register 4. The frame register 4 sequentially stores the demodulation result corresponding to one information frame. The demodulation result includes at least one PCB, which is inserted by the transmitter 20 to control the transmission power, and other information bits. The bit extractor 5 extracts the PCB and an information symbol immediately preceding the PCB.

The PCB extracted by the bit extractor 5 is output to the transmission power controller 10. The transmission power controller 10 estimates a transmission loss (attenuation amount) between the transmitter 20 and the receiver 1 on the basis of the power of the PCB, and predicts the power required for transmission from the estimated transmission loss, thereby controlling the transmission power. The puncture processor 10a performs puncture processing for the PCB portion extracted by the bit extractor 5, i.e., replacing the demodulation result corresponding to the PCB with a neutral erasure symbol to cause the demodulation result to be neglected in an audio decoding operation.

The PCB and the information symbol immediately preceding the PCB, which are extracted by the bit extractor 5, are respectively supplied to the integrators 6a and 6b. The integrators 6a and 6b respectively integrate the power values of the PCB and the information bit. The integration processes in the integrators 6a and 6b reduce the influence of noise added to a signal on the communication line, and also average/reduce the influence of power variations due to multipath fading on the communication line. The integrators 6a and 6b output the power integration results to the comparator 7. The comparator 7 compares the results obtained by integrating the power values of a PCB and an information symbol input for, e.g., each information frame. The comparison result is sent to the rate determination device 8.

Information symbols corresponding to the respective information data rates, i.e., 9,600, 4,800, 2,400, and 1,200 bps, are transmitted from the transmitter 20 at the power ratios with respect to the PCB in FIG. 3. More specifically, at a information data rate of 9,600 bps, the power ratio of the PCB to the information symbol is set to be 1:1; at a information data rate of 4,800 bps, 2:1; at a information data rate of 2,400 bps, 4:1; and, at 1,200 bps, 8:1.

The rate determination device 8 therefore determines a information data rate in such a manner that if $R \leq 1.5$ where R is the ratio of the power of the PCB integrated by the integrator 6a to the power of the information symbol integrated by the integrator 6b, 9,600 bps is selected; if $1.5 < R \leq 3$, 4,800 bps is selected; if $3 < R \leq 6$, 2,400 bps is selected; and $R > 6$, 1,200 bps is selected. The result is used to select one of the decoders 9a to 9d.

As described above, according to this embodiment, the information data rate used for a received frame can be determined before a decoding process without requiring many circuits and many steps in arithmetic processing, which are required for the conventional scheme of performing decoding processes with respect to all the four information data rates, i.e., 9,600 bps, 4,800 bps, 2,400 bps, and 1,200 bps, re-coding the decoding results, and performing correlation processing with respect to the reception system.

The present invention has be en described with reference to the above embodiment. However, the present invention is not limited to the above mode, and includes many modes conforming to the principle of the present invention.

The present invention will be described next with reference to a case wherein an information signal is transmitted from a base station (transmitter 20) to a terminal station (receiver 1).

In the terminal station, an information data rate is determined before a decoding process on the basis of a PCB inserted in each information frame in the base station.

As describe d above with reference to TIA.is 95, in transmitting a signal from the base station to the terminal station, one of the four information data rates, i.e., 1,200, 2,400, 4,800, and 9,600 bps is selected for each information frame time (20 ms) in accordance with the amount and quality of data to be transmitted by the user. The transmission output power is represented by ratios of ⅛, ¼, ½, and 1 in correspondence with the four transmission ratios, respectively, when the output is assumed to be "1" at 9,600 bps. Different power values are used accordingly.

The information data rate used for the information frame can therefore be determined from the reception power in the terminal station.

In the base station, the PCB generator 25 inserts a plurality of PCBs (16 PCBs per information frame in practice) in each information frame at predetermined intervals to control the transmission power (the power required for transmission of a signal from the terminal station to the base station) in the terminal station.

In this case, since the base station transmits each information frame after inserting (overwriting) PCBs on information bits at predetermined positions, the terminal station can recognize which symbols in the information frame are the PCBs. When the terminal station is to restore information transmitted from the base station, the information is decoded after the PCB portions are removed.

A constant transmission power value is set for each PCB. That is, the same value as the transmission power used to transmit an information frame at 9,600 bps is used for each PCB.

In the terminal station receiver, therefore, the information data rate used in the base station to transmit a given frame can be determined by checking the power value of each information symbol in the received frame with reference to the reception power value of each PCB.

More specifically, when the power ratio of the PCB to the information symbol on the information frame is 1:1, the information data rate of the frame is 9,600 bps; when 1:2, 4,800 bps; when 1:4, 2,400 bps; and when 1:8, 1,200 bps.

On a communication line, noise or the like is added to a signal transmitted from the base station. For this reason, the power values of a plurality of PCBs inserted in one information frame are integrated, and the power values of information symbols equal in number to the PCBs are also integrated. The two obtained results are then compared with each other. With this operation, the influence of the noise added to a signal on the communication line can be reduced (filtering).

In general, a terminal station receiver has an AGC (Automatic Gain Control) circuit. This circuit controls the gain of an amplifier with respect to a received signal such that the power of the received signal is kept constant in terms of time. This control is preferably performed at a speed which allows the control operation to follow power variations due to multipath fading on the communication line. More specifically, the speed is set to be about several hundred Hz.

Although the gain of the amplifier may be changed in one information frame by the AGC circuit, the influence of a change in the gain of the amplifier due to the AGC circuit can be eliminated by comparing the power value of a PCB with that of an information system immediately preceding or succeeding the PCB.

As has been described above, according to the present invention, the information data rate used for a received frame can be determined before a decoding process without requiring many steps in arithmetic processing, which are required for the conventional scheme of performing decoding processes with respect to all the information data rates, re-coding the decoding results, and performing correlation processing with respect to the reception system. Therefore, great reductions in circuit arrangement and processing amount can be realized, and the overall power consumption of the terminal station receiver can also be reduced.

According to the present invention, the circuit size of the terminal station receiver conforming to the TIA.IS95 scheme (CDMA) as a standard of a digital cellular system in the North America is preferably reduced, and reductions in power consumption and cost are preferably attained.

In addition, according to the present invention, by integrating outputs from the power extraction means, the influence of noise added to a signal on a communication line can be reduced, and the influence of power variations due to multipath fading on the communication line is averaged and reduced, thereby improving the data rate detection precision.

Furthermore, according to the present invention, the influence of a change in the gain of an amplifier due to the AGC circuit can be eliminated by comparing the power value of a PCB with that of an information symbol immediately preceding or succeeding the PCB.

What is claimed is:

1. A data rate detector for a terminal station receiver receiving a coded signal which is transmitted at a selected one of a plurality of information data rates and whose transmission power is at a value related to a predetermined ratio in accordance with the selected information data rate, the coded signal having at least one power control bit inserted in one information frame to control the transmission power value in the terminal station, the transmission power value being constant regardless of the selected information data rate, said data rate detector comprising:

power extraction means for extracting a reception power value of the power control bit and a reception power value of an information symbol other than the power control bit from a plurality of symbols constituting an information frame obtained by demodulating the received coded signal at a predetermined interval;

comparing means for comparing the two reception power values extracted by said power extraction means; and detection means for detecting a used information data rate on the basis of the comparison obtained by said comparing means.

2. The detector according to claim 1, wherein the power control bit includes a plurality of power control bits inserted in one information frame at predetermined positions.

3. The detector according to claim 2, further comprising first and second integration means for respectively integrating, the same number of times, the two reception power values extracted by said power extraction means and wherein said comparing means compares integration results from said first and second integration means for each information frame.

4. The detector according to claim 1, wherein said power extraction means extracts a reception power value of an information symbol at a position immediately before the power control bit.

5. The detector according to claim 1, further comprising a plurality of decoding means, arranged in correspondence with the information data rates, for decoding a demodulated information frame, and wherein said detection means selects one of said decoding means in accordance with a detected information data rate.

6. The detector according to claim 1, further comprising demodulation means for demodulating a received signal, and register means for storing one information frame output from said demodulation means, and wherein said power extraction means extracts reception power values of the power control bit and the information symbol from one information frame stored in said register means.

7. The detector according to claim 1, further comprising transmission power control means for controlling the transmission power in the terminal station on the basis of the reception power value of the power control bit which is extracted by said power extraction means, and puncture processing means for performing puncture processing of the power control bit inserted in the information frame.

8. The detector according to claim 1, wherein the coded signal is transmitted in accordance with a code division multiple access scheme.

9. A data rate detector for a terminal station receiver receiving a coded signal which is transmitted at a selected one of a plurality of information data rates and whose transmission power is at a value relative to a predetermined ratio in accordance with the selected information data rate, the coded signal having at least one power control bit inserted in one information frame to control the transmission power value in the terminal station, the transmission power value being constant regardless of the selected information data rate, said data rate detector comprising:

power extraction means for extracting a reception power value of the power control bit and a reception power value of an information symbol other than the power control bit from a plurality of symbols constituting an information frame obtained by demodulating the received coded signal at a predetermined interval;

first and second integration means for respectively integrating, the same number of times, the two reception power values extracted by said power extraction means;

comparing means for comparing the integration results from said first and second integration means with each other; and detection means for detecting a used information data rate on the basis of the comparison result obtained by said comparing means.

10. A terminal station receiver for receiving a coded signal which is transmitted at a selected one of a plurality of information data rates and whose transmission power is at a value relative to a predetermined ratio in accordance with the selected information data rate, the coded signal having at least one power control bit inserted in one information frame to control the transmission power value in the terminal station, the transmission power value being constant regardless of the selected information data rate, said terminal station receiver comprising:

demodulation means for demodulating the received coded signal;

register means for storing one information frame output from said demodulation means;

power extraction means for extracting a reception power value of the power control bit and a reception power value of an information symbol immediately preceding the power control bit from a plurality of symbols constituting the one information frame stored in said register means;

first and second integration means for respectively integrating, the same number of times, the two reception power values extracted by said power extraction means;

comparing means for comparing the integration results from said first and second integration means with each other;

detection means for detecting a used information data rate on the basis of the comparison result obtained by said comparing means; and a plurality of decoding means, arranged in correspondence with the information data rates, for decoding a demodulated information frame, said decoding means being selected by said detection means.

11. The receiver according to claim 10, further comprising transmission power control means for controlling the transmission power in the terminal station on the basis of the reception power value of the power control bit which is extracted by said power extraction means, and puncture processing means for performing puncture processing of the power control bit inserted in the information frame.

12. The receiver according to claim 10, wherein the transmission power ratio is set to 1, ½, ¼ and ⅛ in correspondence with the information data rates 9600, 4800, 2400 and 1200 bps, respectively, with the value of the transmission power controlled by the power control bit being the same as the transmission power used in the information data rate of 9600 bps.

13. The receiver according to claim 10, wherein the coded signal is repeatedly sent in correspondence with the selected information data rate so that a predetermined symbol is established per information frame.

14. The detector according to claim 9, wherein the transmission power ratio is set to 1, ½, ¼ and ⅛ in correspondence with the information data rates 9600, 4800, 2400 and 1200 bps, respectively, with the value of the transmission power controlled by the power control bit being the same as the transmission power used in the information data rate of 9600 bps.

15. The detector according to claim 9, wherein the coded signal is repeatedly sent in correspondence with the selected information data rate so that a predetermined symbol is established per information frame.

16. The detector according to claim 1, wherein the transmission power ratio is set to 1, ½, ¼ and ⅛ in correspondence with the information data rates 9600, 4800, 2400 and 1200 bps, respectively, with the value of the transmission power controlled by the power control bit being the same as the transmission power used in the information data rate of 9600 bps.

17. The detector according to claim 1, wherein the coded signal is repeatedly sent in correspondence with the selected information data rate so that a predetermined symbol is established per information frame.

18. A data rate detector for a terminal station receiver receiving a coded signal which is transmitted at a selected one of a plurality of information data rates and whose transmission power value is at a value relative to a predetermined ratio in accordance with the selected information data rate, the coded signal having at least one power control bit inserted in one information frame to control the transmission power value in the terminal station, the transmission power value being constant regardless of the selected information data rate, said data rate detector comprising:

an extractor extracting a reception power value of the power control bit and a reception power value of an information symbol other than the power control bit from a plurality of symbols constituting an information frame obtained by demodulating the received coded signal at a predetermined interval;

a comparator comparing the two reception power values extracted by said extractor; and a detector detecting a used information data rate on the basis of the comparison obtained by said comparator.

19. A data rate detector for a terminal station receiver receiving a coded signal which is transmitted at a selected one of a plurality of information data rates and whose transmission power is at a value relative to a predetermined ratio in accordance with the selected information data rate, the coded signal having at least one power control bit inserted in one information frame to control the transmission power value in the terminal station, the transmission power value being constant regardless of the selected information data rate, said data rate detector comprising:

an extractor extracting a reception power value of the power control bit and a reception power value of an information symbol other than the power control bit from a plurality of symbols constituting an information frame obtained by demodulating the received coded signal at a predetermined interval;

first and second integrator respectively integrating, the same number of times, the two reception power values extracted by said extractor;

a comparator for comparing the integration results from said first and second integrators with each other; and a detector detecting a used information data rate on the basis of the comparison result obtained by said comparator.

20. A terminal station receiver for receiving a coded signal which is transmitted at a selected one of a plurality of information data rates and whose transmission power is at a value relative to a predetermined ratio in accordance with the selected information data rate, the coded signal having at least one power control bit inserted in one information frame to control the transmission power value in the terminal station, the transmission power value being constant regardless of the selected information data rate, said terminal station receiver comprising:

a demodulator demodulating the received coded signal;

a register storing one information frame output from said demodulator;

an extractor extracting a reception power value of the power control bit and a reception power value of an information symbol immediately preceding the power control bit from a plurality of symbols constituting the one information frame stored in said register;

first and second integrators respectively integrating, the same number of times, the two reception power values extracted by said extractor;

a comparator comparing the integration results from said first and second integrators with each other;

a detector detecting a used information data rate on the basis of the comparison result obtained by said comparator; and a plurality of decoders arranged in correspondence with the information data rates, and a selected decoder decoding a demodulated information frame, the selected decoder being selected by said detector.

* * * * *